United States Patent
Guo et al.

(10) Patent No.: US 11,328,535 B1
(45) Date of Patent: May 10, 2022

(54) MOTION IDENTIFICATION METHOD AND SYSTEM

(71) Applicant: ioNetworks INC., New Taipei (TW)

(72) Inventors: Jing-Ming Guo, New Taipei (TW); Po-Cheng Huang, New Taipei (TW); Ting Lin, New Taipei (TW); Chih-Hung Wang, New Taipei (TW); Yu-Wen Wei, New Taipei (TW); Yi-Hsiang Lin, New Taipei (TW)

(73) Assignee: IONETWORKS INC., New Taipei (TW)

( * ) Notice: Subject to any disclaimer, the term of this patent is extended or adjusted under 35 U.S.C. 154(b) by 0 days.

(21) Appl. No.: 17/107,439

(22) Filed: Nov. 30, 2020

(51) Int. Cl.
*G06K 9/00* (2022.01)
*G06V 40/20* (2022.01)
*G08B 21/18* (2006.01)
*G06T 7/246* (2017.01)

(52) U.S. Cl.
CPC .............. *G06V 40/23* (2022.01); *G06T 7/248* (2017.01); *G08B 21/18* (2013.01); *G06T 2207/10024* (2013.01); *G06T 2207/10028* (2013.01); *G06T 2207/10048* (2013.01); *G06T 2207/20081* (2013.01); *G06T 2207/20084* (2013.01); *G06T 2207/30196* (2013.01)

(58) Field of Classification Search
CPC .................... G06V 40/23; G06T 7/248; G06T 2207/10024; G06T 2207/10028; G06T 2207/10048; G06T 2207/20081; G06T 2207/20084; G06T 2207/30196; G08B 21/18
USPC ....................................................... 382/103
See application file for complete search history.

(56) References Cited

U.S. PATENT DOCUMENTS

| | | | |
|---|---|---|---|
| 9,358,456 B1* | 6/2016 | Challinor | A63F 13/428 |
| 2011/0244956 A1* | 10/2011 | Sakakibara | A63F 13/213 463/31 |
| 2011/0306397 A1* | 12/2011 | Fleming | A63F 13/44 463/7 |

(Continued)

OTHER PUBLICATIONS

Chaaraoui, Alexandros, Jose Padilla-Lopez, and Francisco Florez-Revuelta. "Fusion of skeletal and silhouette-based features for human action recognition with rgb-d devices." Proceedings of the IEEE international conference on computer vision workshops. 2013. (Year: 2013).*

(Continued)

*Primary Examiner* — Jonathan S Lee
(74) *Attorney, Agent, or Firm* — Chun-Ming Shih; Lanway IPR Services

(57) ABSTRACT

The present invention provides an action recognition method and system thereof. The action recognition method comprises: capturing a 2D image and a depth image at the same time, extracting an 2D information of the human skeleton points from the 2D image and correcting it, mapping the 2D information of the human skeleton points to the depth image to obtain the corresponding depth information with respect to the 2D information of the human skeleton points and combining the corrected 2D information of the human skeleton points and the depth information to obtain the 3D information of the human skeleton points, and finally recognizing an action from a set of 3D information of the human skeleton points during a period of time by a matching model.

10 Claims, 7 Drawing Sheets

(56) References Cited

U.S. PATENT DOCUMENTS

| | | | | |
|---|---|---|---|---|
| 2011/0306398 A1* | 12/2011 | Boch | ............ | A63F 13/5375 |
| | | | | 463/7 |
| 2012/0143358 A1* | 6/2012 | Adams | ............ | G06K 9/00342 |
| | | | | 700/92 |
| 2017/0351910 A1* | 12/2017 | Elwazer | ............ | H04N 13/204 |

OTHER PUBLICATIONS

De Boissiere, Alban Main, and Rita Noumeir. "Infrared and 3d skeleton feature fusion for rgb-d action recognition." IEEE Access 8 (2020): 168297-168308. (Year: 2020).*

Laraba, Sohaib, et al. "3D skeleton-based action recognition by representing motion capture sequences as 2D-RGB images." Computer Animation and Virtual Worlds 28.3-4 (2017): e1782. (Year: 2017).*

Liu, Jianbo, et al. "3D PostureNet: A unified framework for skeleton-based posture recognition." Pattern Recognition Letters 140 (2020): 143-149. (Year: 2020).*

Mehta, Dushyant, et al. "Vnect: Real-time 3d human pose estimation with a single rgb camera." ACM Transactions on Graphics (TOG) 36.4 (2017): 1-14. (Year: 2017).*

Miki, Daisuke, et al. "Robust human motion recognition from wide-angle images for video surveillance in nuclear power plants." Mechanical Engineering Journal (2020): 19-00533. (Year: 2020).*

Rahmani, Hossein, and Mohammed Bennamoun. "Learning action recognition model from depth and skeleton videos." Proceedings of the IEEE International Conference on Computer Vision. 2017. (Year: 2017).*

* cited by examiner

MOTION IDENTIFICATION METHOD AND SYSTEM

BACKGROUND OF THE INVENTION

1. Field of the Invention

The present invention relates to a motion identification method and system thereof, especially to a motion identification method and system for multimodality image integration and simulation.

2. Description of Related Art

Human Action Recognition (HAR) is a very popular research topic in recent years, and many methods and technologies have been developed in the field of context awareness, exercise monitoring, and elderly care. Among them, the positioning technology for human skeleton point in two-dimensional (2D) images has been well-developed. Real-time 2D RGB images (red, green and blue images) or infrared images (IR images) can be used to identify and locate the head, torso, Upper limbs and lower limbs, and then to determine the state of human activity. However, in some human action recognition or motion identification, it is often impossible to distinguish some human motions using only two-dimensional skeleton point information. For example, in some human motions, the projection of the skeleton points on the plane overlaps in many places, so it is impossible to recognize and distinguish these human actions.

Therefore, as shown in FIG. 1, we often rely on the coordinate information of the human body's three-dimensional point cloud (3D point cloud) for a higher accurate human action recognition. The coordinate information of the 3D point cloud obtained by the 3D sensor is a huge amount of information. If the resolution of the 3D sensor is too high, it will take too much resources and time to calculate and get the human skeleton point positioning map. If the resolution is too low, the correct skeleton points may not be recognized due to background noise, and then the accuracy of motion identification is reduced. Therefore, there is an urgent need for a real-time motion identification method and system with high-accuracy.

SUMMARY OF THE INVENTION

The present invention provides a motion identification method comprising: capturing a 2D color image or a 2D infrared image and a corresponding depth image at a time point; extracting a 2D human skeleton point information from the 2D color image or the 2D infrared image; mapping the 2D human skeleton point information to the depth image to obtain a depth information corresponding to the 2D human skeleton point information; correcting the 2D human skeleton point information using a size-depth parameter and a distortion model; combining the corrected 2D human skeleton point information and the depth information to obtain a 3D human skeleton point information; and applying a match model to a series of the 3D human skeleton point information in a period of time to identify a motion.

The present invention further provides a motion identification system, comprising: an image capturing device for capturing a 2D color image or a 2D infrared image at a time point; a depth image capturing device for capturing a corresponding depth image at the time point; a memory for storing a size-depth parameter, a distortion model, and a match model; and a processor electrically connected to the image capturing device, the depth image capturing device and the memory, the processor comprising: an input module for receiving the 2D color image or the 2D infrared image and the corresponding depth image; a storage module for storing the 2D color image or the 2D infrared image and the corresponding depth image to the memory; a skeleton points calculation module for extracting a 2D human skeleton point information from the 2D color image or the 2D infrared image and correcting the 2D human skeleton point information using the size-depth parameter and the distortion model; a mapping module for mapping the 2D human skeleton point information to the depth image to obtain a depth information corresponding to the 2D human skeleton point information and combining the corrected 2D human skeleton point information and the depth information to obtain a 3D human skeleton point information; and a motion identification module for applying a match model to a series of the 3D human skeleton point information in a period of time to identify a motion In some specific embodiment, the motion identification system further comprises an output module for transmitting an alert signal while the motion is identified.

In some specific embodiment, the match model is a classification model parameter established by a deep learning framework of neural network.

In some specific embodiment, the distortion model is used to correct the distance between the pixel coordinate position of the 2D human skeleton point and the image distortion center.

In some specific embodiment, the memory further stores a set of displacement parameters, and the depth image is corrected with the displacement parameter in advance.

The motion identification method and system provided by the present invention can solve the problems of time-consuming calculation of 3D human skeleton points and susceptibility to device resolution or noise, and propose a multi-modality image integration method and system that can quickly and accurately stimulate the 3D skeleton point information. This system and method can be applied to various situation for real-time human activity recognition, such as fall detection.

Unless otherwise defined herein, all technical and scientific terms used have the same meaning as commonly understood by those skilled in the art to which the present invention belongs.

As used herein, the articles "a", "an" and "any" refer to one or more than one (i.e. at least one) grammatical items. For example, "a component" means a component or more than a component.

The term "about", "approximately" or "nearly" used herein substantially represents the stated value or range within 20%, preferably within 10%, and more preferably within 5%. The digitized quantities provided in the article are approximate value, meaning that if the terms "about", "approximately" or "nearly" are not used, they can be inferred.

DETAILED DESCRIPTION OF THE PREFERRED EMBODIMENTS

Other technical contents, aspects and effects in relation to the present invention can be clearly appreciated through the detailed descriptions concerning the preferred embodiments of the present invention in conjunction with the appended drawings.

Figure 1:
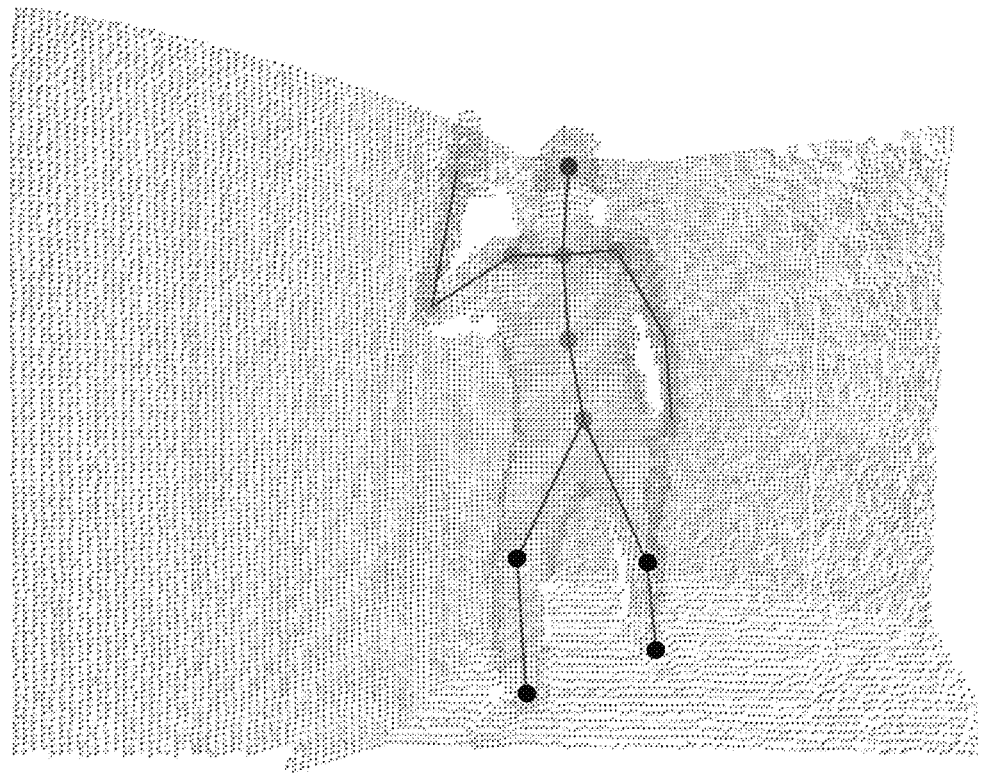
FIG. 1 shows a calculated human skeleton point positioning map using a 3D sensor which captures the human motion.
Figure 2:
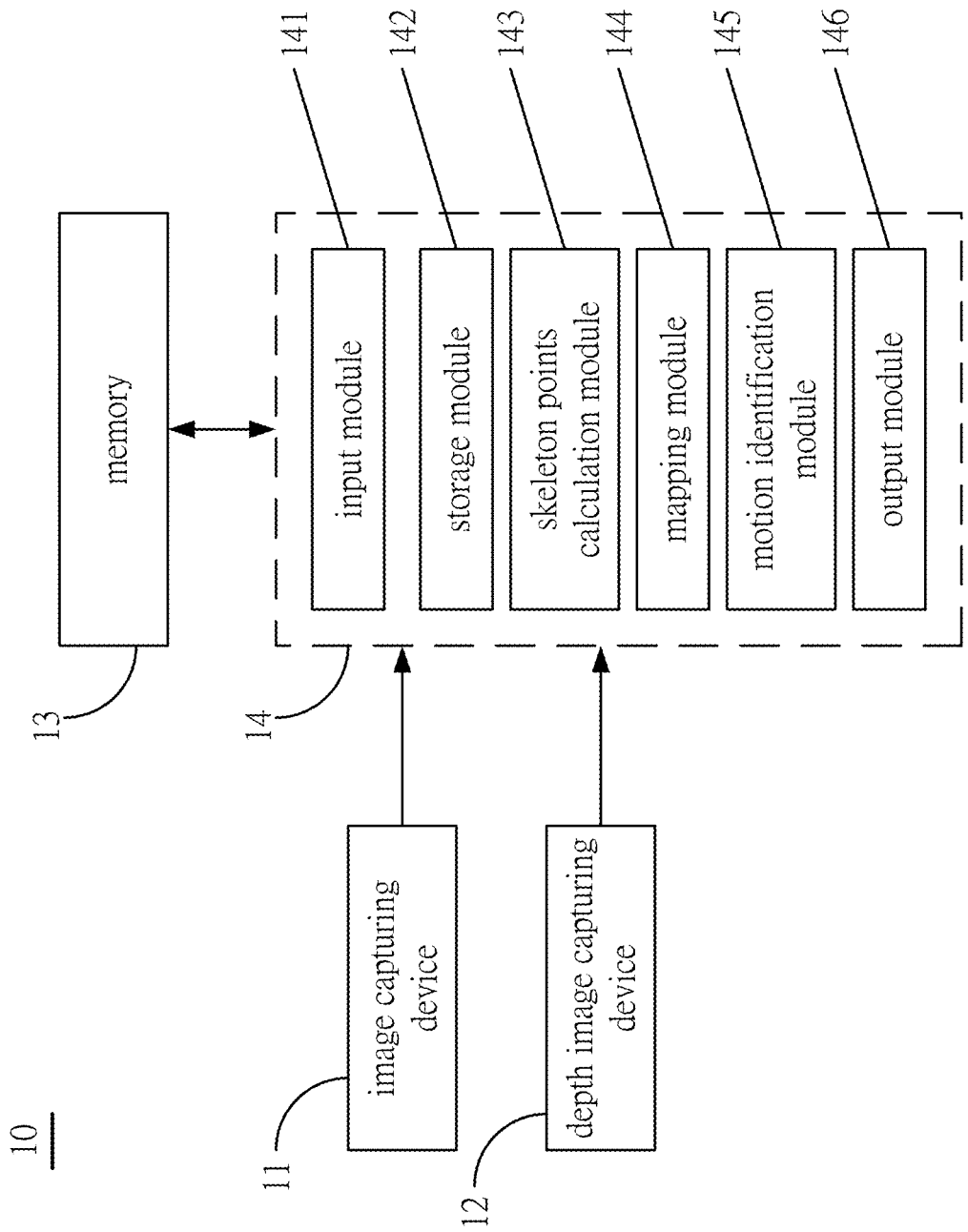
FIG. 2 shows a block diagram for the motion identification system according to one embodiment of the present invention.

As shown in FIG. 2, one embodiment of the present invention provides a motion identification system 10 comprising: an image capturing device 11, a depth image capturing device 12, a memory 13 and a processor 14. The processor 14 comprises an input module 141, a storage module 142, a skeleton points calculation module 143, a mapping module 144 and a motion identification module 145. The motion identification system 10 further comprises an output module 146.

Figure 3:
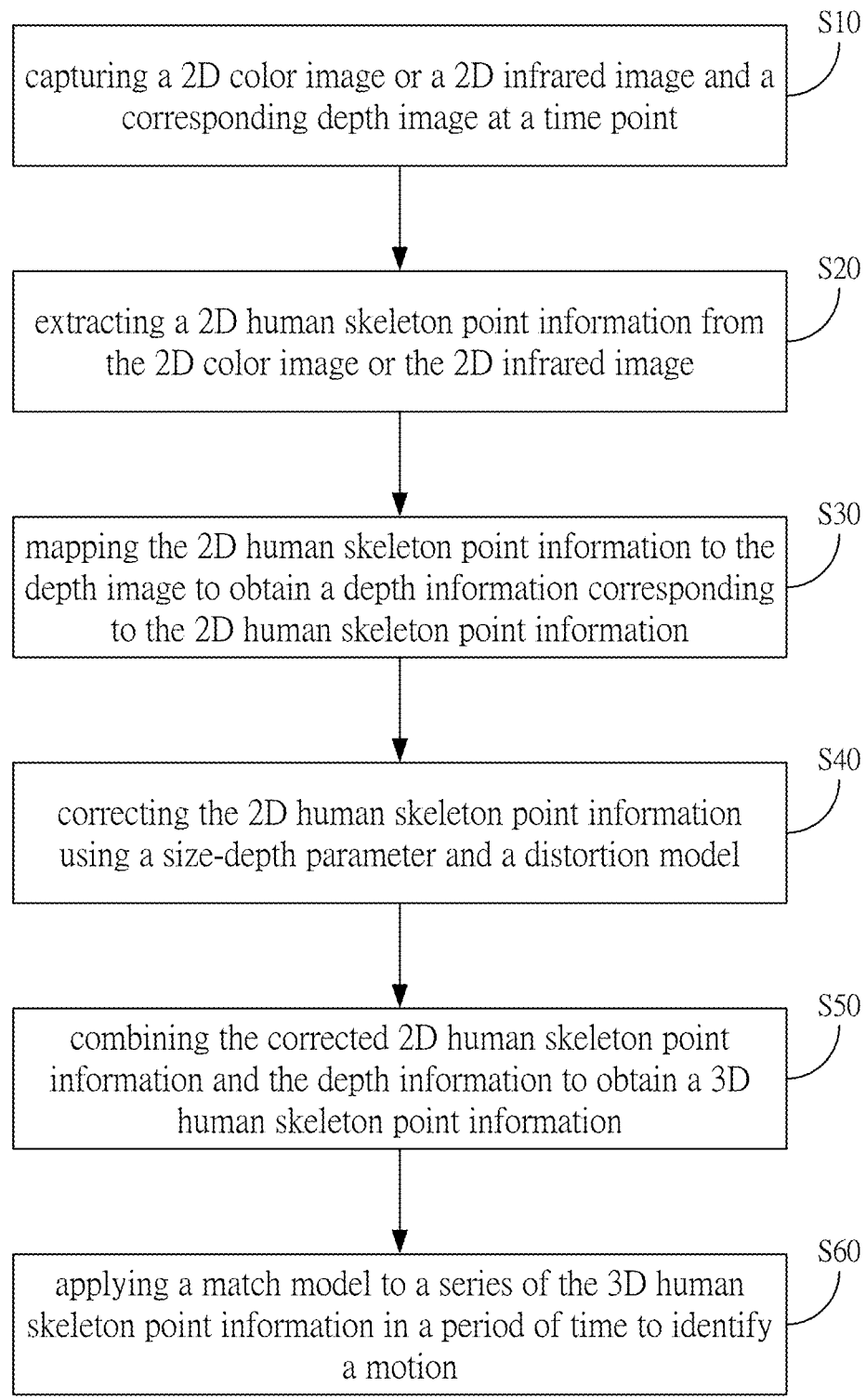
FIG. 3 shows a flow chart for the motion identification method according to one embodiment of the present invention.

As shown in FIG. 3, the embodiment of the present invention provides a motion identification method comprising: capturing a 2D color image or a 2D infrared image and a corresponding depth image at a time point (step S10); extracting a 2D human skeleton point information from the 2D color image or the 2D infrared image (step S20); mapping the 2D human skeleton point information to the depth image to obtain a depth information corresponding to the 2D human skeleton point information (step S30); correcting the 2D human skeleton point information using a size-depth parameter and a distortion model (step S40); combining the corrected 2D human skeleton point information and the depth information to obtain a 3D human skeleton point information (step S50); and applying a match model to a series of the 3D human skeleton point information in a period of time to identify a motion (step S60).

Please refer to FIG. 2 and FIG. 3 for understanding the embodiment of the present invention, the image capturing device 11 is used to capture a 2D color image or a 2D infrared image at one time point. The 2D color image may be a flat RGB color image, such as a picture captured by an ordinary camera or a frame of a video captured by a video recorder. Each pixel in the 2D color image carries a color information which may be a content matrix information of red, green, and blue. The 2D infrared image may be a flat grayscale image captured under near-infrared illumination, which is commonly used for night recognition or detection. In the case of insufficient lighting, a grayscale image with good resolution can still be captured. Each pixel in the 2D infrared image represents the infrared intensity detected by the infrared sensor.

The depth image capturing device 12 is used to capture a corresponding depth image at the time point, which may be a time of flight (TOF) sensor or a depth camera (for example: Intel RealSense). In order to map the 2D color image or the 2D infrared image to the corresponding depth image, it is necessary to obtain the corresponding depth image simultaneously with capturing the 2D color image or the 2D infrared image. The depth image is also a 2D image, and each pixel in the 2D image represents the distance between the plane of the corresponding object captured in that pixel and the sensor.

The memory 13 is used to store a matching model for identifying different actions. In the embodiment of the present invention, taking the fall recognition as an example, the height of the sensing device is 2 meters, which could be the image capturing device 11 and the depth image capturing device 12 of the embodiment of the present invention. A total of 60,000 pictures are captured. The resolution is 620*350. Half of the pictures are continuous frame picture of falling motion, and the other pictures are continuous frame picture of non-falling motion. A dynamic continuous frame sequence of falling motion and a dynamic continuous frame sequence of non-falling motion are sampled. A 2D human skeleton points calculation is performed on each frame of the sequence, and the corresponding depth image is combined to calculate the simulated 3D skeleton point coordinates. The four-dimensional (4D) dynamic feature sequence is obtained by combining the 3D skeleton point coordinates of each frame in the entire time sequence and used as the input feature for motion recognition. The sequence of dynamic coordinate points corresponding to the 3D human skeleton points in time series is an important feature of motion recognition. Neural network architectures for deep learning can be used for conducting deep learning to construct a matching model that can recognize different dynamic activities of subjects, such as Long Short-Term Memory (LSTM) or Convolutional Neural Networks (CNN).

The processor 14 is electrically connected to the image capturing device 11, the depth image capturing device 12 and the memory 13. The image capturing device 11 and the depth image capturing device 12 capture a 2D color image or a 2D infrared image and a corresponding depth image at a time point (step S10), and then transmit them to the processor 14 in a wired or wireless manner. The input module 141 is used for receiving the 2D color image or the 2D infrared image and the corresponding depth image. In order to facilitate subsequent utilization, the storage module 142 could store the 2D color image or the 2D infrared image and the corresponding depth image in the memory 13 for retrieval and use at any time.

Figure 4A:
FIG. 4A shows a gray-scale schematic diagram of the skeleton points in a color image for a non-fall condition according to one embodiment of the present invention.
Figure 4B:
FIG. 4B shows a gray-scale schematic diagram of the skeleton points in a color image for a fall dynamic motion according to one embodiment of the present invention.

Please refer to FIGS. 4A and 4B together, which are gray-scale schematic diagrams of the skeleton points in a color image for a non-fall condition and a fall dynamic motion. Although we takes the 2D color image as an example and presents the example in the gray-scale schematic diagrams in the embodiment of the present invention, the system and method of the embodiment of the present invention are not limited to using the 2D color images. The 2D infrared image is a gray-scale image and could serve the same function with the 2D color image. The skeleton points calculation module 143 is used to extract the 2D human skeleton point information from the 2D color image or the 2D infrared image (step S20). The parallel convolutional network architecture could be used to recognize the 2D human skeleton point information in the 2D color images or the 2D infrared images by detecting the confidence map of the joint point position, obtaining the Part Affinity Fields to describe the degree of connection between the joints and integrating the above two features to estimate each limb segment to obtain the 2D human skeleton point information.

The 2D human skeleton point information is a data list comprising 2D coordinates which could indicate the pixel position in the 2D color image or the 2D infrared image corresponding to the real human skeleton point. The 2D human skeleton point information is the relative position on the 2D color image to which the real plane is mapped. The common form may be the pixel position of 18 skeleton points, which is a 2×18 matrix. For example, the center point on the head in the non-falling image in FIG. 4A represents that the pixel position of the nose in the 2D color image is (361, 88).

Figure 5A:
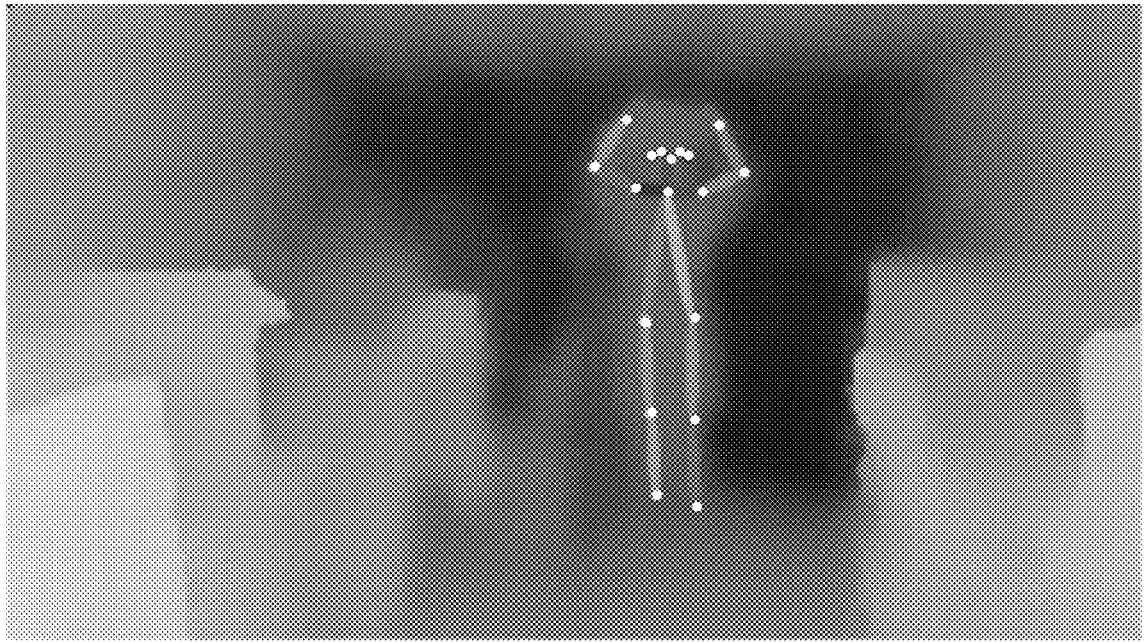
FIG. 5A shows a gray-scale schematic diagram of the skeleton points in a depth image for a non-fall condition according to one embodiment of the present invention.
Figure 5B:
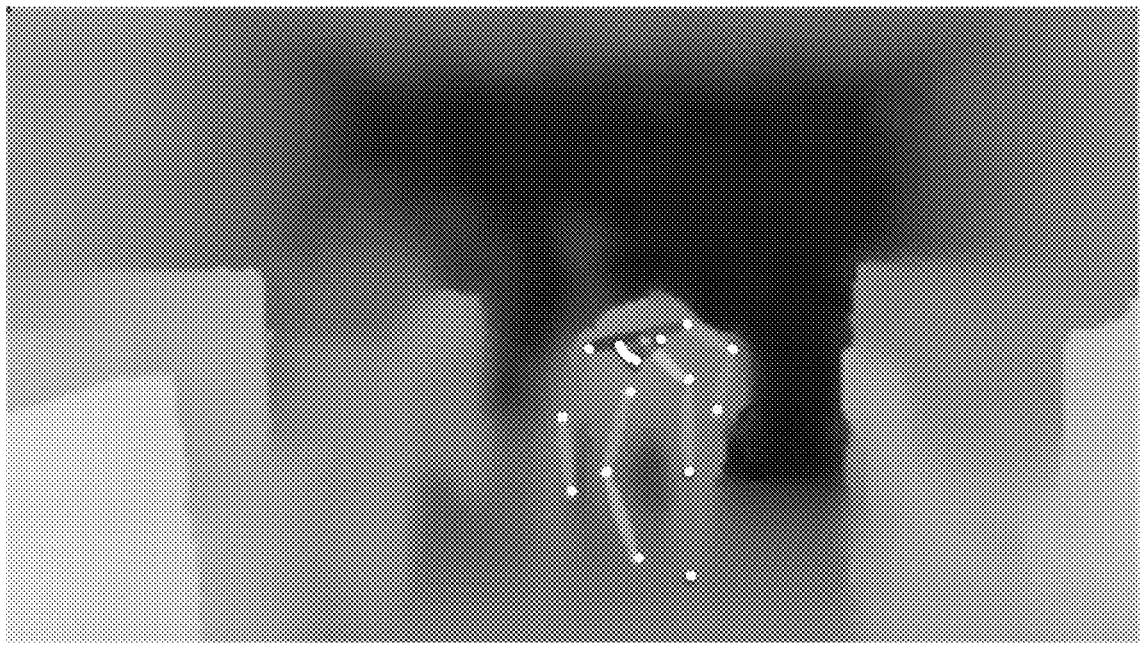
FIG. 5B shows a gray-scale schematic diagram of the skeleton points in a depth image for a fall dynamic motion according to one embodiment of the present invention.

Please refer to FIG. 5A and FIG. 5B together, which are gray-scale schematic diagrams of the skeleton points in a depth image for a non-fall condition and a fall dynamic motion. The key point of the embodiments of the present invention is to quickly obtain the 3D human skeleton point information. Firstly, the 2D color image or the 2D infrared image is used to obtain the planar human skeleton point information, and then combined with the depth image to form the 3D human skeleton point information. Therefore, the 2D color image/the 2D infrared image and the depth image must be mapped to each other in advance to obtain the depth information from the corresponding depth image. The mapping module 144 is used to map the 2D human skeleton point information to the depth image to obtain a depth information corresponding to the 2D human skeleton point information (step S30). When mapping the human skeleton point information in a 2D color image or a 2D infrared image to a depth image, the corresponding values in the same pixel positions corresponding to the pixel positions of the human skeleton points in the 2D color image or the 2D infrared image could be obtained from the depth image. Each of the values represents the distance between the plane of the human skeleton point captured into the pixel and the sensor, which is the depth information.

Although the 2D color image or the 2D infrared image and the depth image are captured at the same time, there is a slight difference in distance between the two image capturing devices, or there are different sizes of field of view (FOV) in the images. In order to improve the accuracy of the mapping, a simple registration could be performed to construct a set of displacement parameters for subsequent correction of the depth image before using the image capturing devices, so that the size of FOV and the image capturing position of the depth image are consistent with those of the 2D color images or the 2D infrared images. A calibration plate or a test object is captured by the image capturing devices. The corresponding position coordinates in the captured 2D color image/2D infrared image and the captured depth image are compared and the pixel position of one feature in the 2D color image or the 2D infrared image is the same pixel position of the same feature in the corrected depth image through image deformation (mesh warping) and reverse mapping for registration. The set of displacement parameters of the depth image after the registration could be applied to the subsequent correction for the depth image and could be stored in the memory 13. One example of the set of displacement parameters could be the displacement of several important calibration points, and the remaining coordinates are adjusted by interpolation to save computing time.

Figure 6A:
FIG. 6A shows a gray-scale schematic diagram of the skeleton points coordination mapping in a long distance according to one embodiment of the present invention.
Figure 6B:
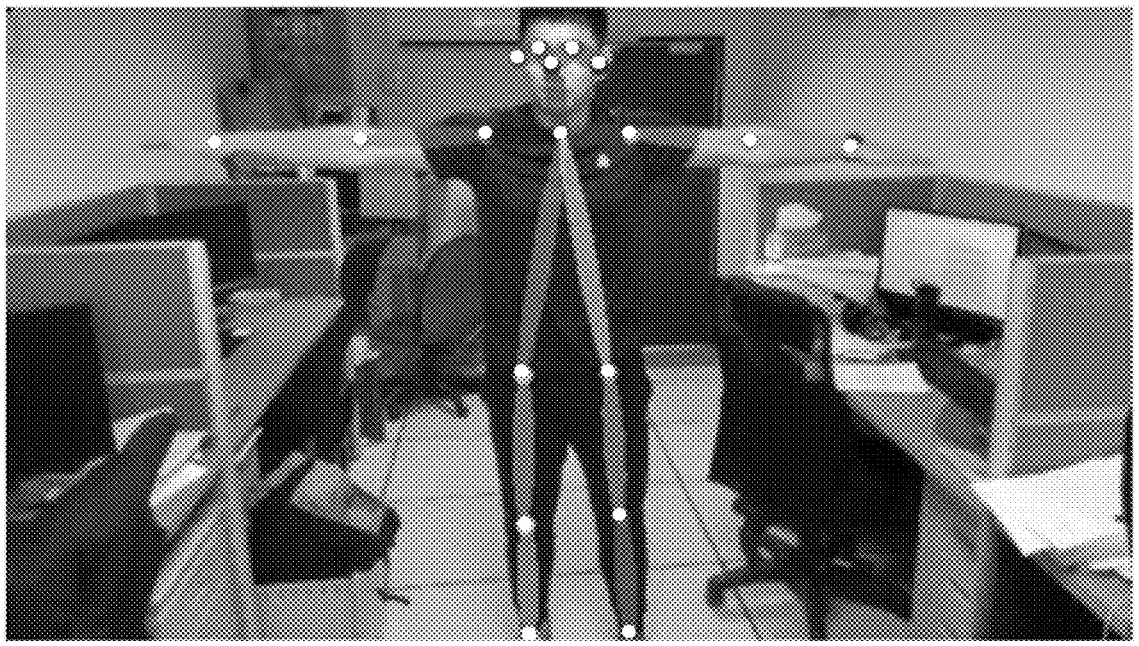
FIG. 6B shows a gray-scale schematic diagram of the skeleton points coordination mapping in a close distance according to one embodiment of the present invention.

As shown in FIG. 6A and FIG. 6B, the same subject at different distances from the same image capturing device would be projected on the 2D color image with different sizes. The farther the person are from the image capture device, the smaller the person is projected on the image (FIG. 6A), and the closer the person are to the image capture device, the larger the person is projected on the image (FIG. 6B). Even for the same subject, the distance between the human skeleton points is inconsistent because of the inconsistent projection size, which will lead to subsequent error in motion recognition. Therefore, it is necessary to restore the 2D human skeleton points detected from the 2D color image or the 2D infrared image to a coordinate space of a consistent scale according to the corresponding depth information to facilitate the simulation of the 3D Cartesian coordinate system (Cartesian coordinate system) positions of the reconstructed human skeleton points. Since such restoration only needs to perform on the extracted 2D human skeleton point information, it can save a lot of time and resources.

By measuring the projected size of the calibration plate or the same object at different positions and then calculating the corresponding scale of the calibration plate or the same object at different distances by linear interpolation, a size-depth parameter is obtained. The size-depth parameter could be stored in the memory 13, and the skeleton points calculation module 143 could use the size-depth parameter to correct the 2D human skeleton point information (step S40). In other words, the depth information corresponding to the 2D human skeleton point information in the 2D color image or the 2D infrared image is obtained. The 2D human skeleton point information is corrected and restored by the corresponding ratio scale calculated from the size-depth parameter to adjust the size of human skeleton at different depth to the same scale.

However, the curvature of the lens surface of the image capturing device leads to the distortion of the image. Even if the distortion effect in a 2D image is not obvious, the image distortion will be magnified during the ratio scale restoration of the image at the corresponding depth and then lead to the problem of limb asymmetry in the 3D human skeleton points after the scale restoration. Especially, the distortion will be more serious after the coordinate restoration when the image capturing device is farther away or deviated from the capturing center point.

In order to solve this problem, it is necessary to perform image distortion correction and restoration for different capturing devices. Multiple 2D color images or 2D infrared images are captured using the calibration board. The internal curvature parameter k of the lens is calculated, and reverse mapping is used to correct and restore the images with a division distortion model L(r).

$$\begin{pmatrix} \hat{x} - x_0 \\ \hat{y} - y_0 \end{pmatrix} = L(r) \begin{pmatrix} x - x_0 \\ y - y_0 \end{pmatrix},$$

wherein $\hat{x}$, $\hat{y}$ are the corrected point coordinates, x and y are the point coordinates of the original image, and $x_c$, $y_c$ are the distortion center points. L(r) is the distortion model, $$L(r) = \frac{1}{1 + k \cdot r^2},$$

and r is the distance from the original coordinate to the distortion center. The distortion correction and restoration is performed on the 2D color images or 2D infrared images. The distortion model could be stored in the memory 13, and the skeleton points calculation module 143 could use the distortion model to correct the 2D human skeleton point information (step S40). Next, the mapping module 144 combines the corrected 2D human skeleton point information and the depth information to calculate and obtain a 3D human skeleton point information (step S50), and the 3D human skeleton point information is very close to the real skeleton point position in space.

Figure 7:
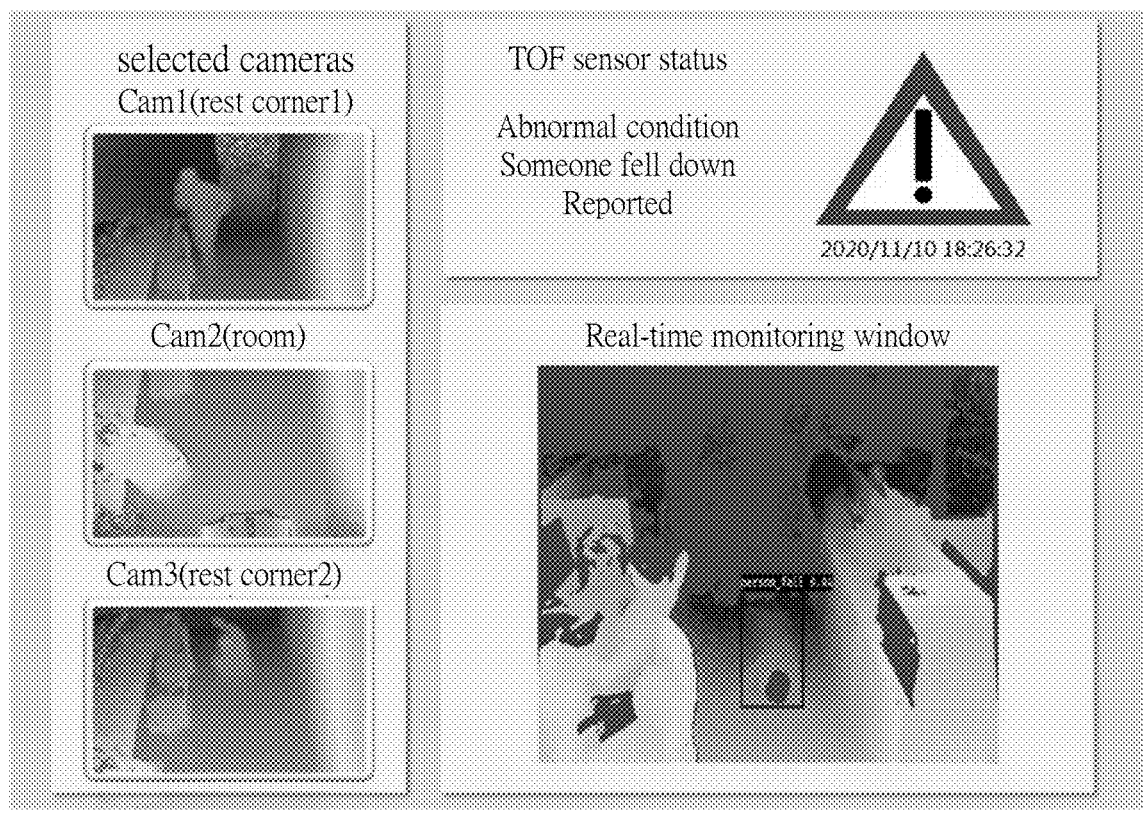
FIG. 7 shows a gray-scale schematic diagram of the motion identification according to one embodiment of the present invention.

As shown in FIG. 7, the embodiment of the present invention can be applied in the field of fall detection, but is not limited to the field of fall detection, and can also be used in the field of sports training. The motion identification module 145 applies a match model to identify a motion on a series of the 3D human skeleton point information during a period of time (step S60). A series of the 3D human skeleton point information during a period of time could be a four-dimensional matrix, that is, a continuous period of 3D human skeleton point information. In order to achieve real-time motion identification, the commonly used time length could be 1 to 2 seconds, preferably 1.5 seconds. When the motion identification diagram is marked in the depth image, a pseudo color can be used to represent different depth information, for example, red represents the distance close to the image capturing device, and blue represents the distance away from the image capturing device. The match model is a behavior classification model parameter established by a deep learning framework and is used to calculate the current dynamic action of the subject and which action is more matched to the match model to identify an action, such as a fall motion.

The motion identification system 10 of the embodiment of the present invention further comprises an output module 146 for transmitting an alert signal while the motion is identified. In the field of fall detection, the alert signal could trigger an alarm or a call-out action to notify family members or police units. The left column of FIG. 7 shows different areas for fall detection, the upper right column shows a fall alert signal, and the lower right column shows the detected screen of falling condition.

The embodiment of the present invention uses RGB 2D color images or 2D infrared images to extract 2D human skeleton point information, and combines depth information to quickly simulate a series of 3D human skeleton point coordinates in a period of time as input for action recognition. The feature is not only more accurate than the 2D human skeleton points, but also saves more resources and calculation time than the 3D human skeleton points measured by the 3D sensor. If it is used as a fall detection system for the elderly in real-time long-term care, it can solve the problem that many planar skeleton points cannot be accurately identified due to the multiple overlaps of skeleton points on the plane during the motion/behavior.

What is claimed is:

1. A motion identification method, comprising
    capturing a 2D color image or a 2D infrared image and a corresponding depth image at a time point;
    extracting a 2D human skeleton point information from the 2D color image or the 2D infrared image;
    mapping the 2D human skeleton point information to the depth image to obtain a depth information corresponding to the 2D human skeleton point information;
    correcting the 2D human skeleton point information using a size-depth parameter and a distortion model;
    combining the corrected 2D human skeleton point information and the depth information to obtain a 3D human skeleton point information; and
    applying a match model to a series of the 3D human skeleton point information in a period of time to identify a motion.

2. The motion identification method of claim 1, further comprising: transmitting an alert signal while the motion is identified.

3. The motion identification method of claim 1, wherein the distortion model is used to correct the distance between the pixel coordinate position of the 2D human skeleton point and the image distortion center.

4. The motion identification method of claim 1, wherein the match model is a classification model parameter established by a deep learning framework of neural network.

5. The motion identification method of claim 1, wherein the depth image is corrected with a displacement parameter in advance.

6. A motion identification system, comprising
    an image capturing device for capturing a 2D color image or a 2D infrared image at a time point;
    a depth image capturing device for capturing a corresponding depth image at the time point;
    a memory for storing a size-depth parameter, a distortion model, and a match model; and
    a processor electrically connected to the image capturing device, the depth image capturing device and the memory, the processor comprising:
        an input module for receiving the 2D color image or the 2D infrared image and the corresponding depth image;
        a storage module for storing the 2D color image or the 2D infrared image and the corresponding depth image to the memory;
        a skeleton points calculation module for extracting a 2D human skeleton point information from the 2D color image or the 2D infrared image and correcting the 2D human skeleton point information using the size-depth parameter and the distortion model;
        a mapping module for mapping the 2D human skeleton point information to the depth image to obtain a depth information corresponding to the 2D human skeleton point information and combining the corrected 2D human skeleton point information and the depth information to obtain a 3D human skeleton point information; and
        a motion identification module for applying a match model to a series of the 3D human skeleton point information in a period of time to identify a motion.

7. The motion identification system of claim 6, further comprising: an output module for transmitting an alert signal while the motion is identified.

8. The motion identification system of claim 6, wherein the distortion model is used to correct the distance between the pixel coordinate position of the 2D human skeleton point and the image distortion center.

9. The motion identification system of claim 6, wherein the match model is a classification model parameter established by a deep learning framework of neural network.

10. The motion identification system of claim 6, wherein the memory further stores a set of displacement parameters, and the depth image is corrected with the displacement parameters in advance.

* * * * *